May 7, 1963 E. F. BENNETT 3,088,214
ALIGNING DEVICE
Filed May 29, 1961 2 Sheets-Sheet 1
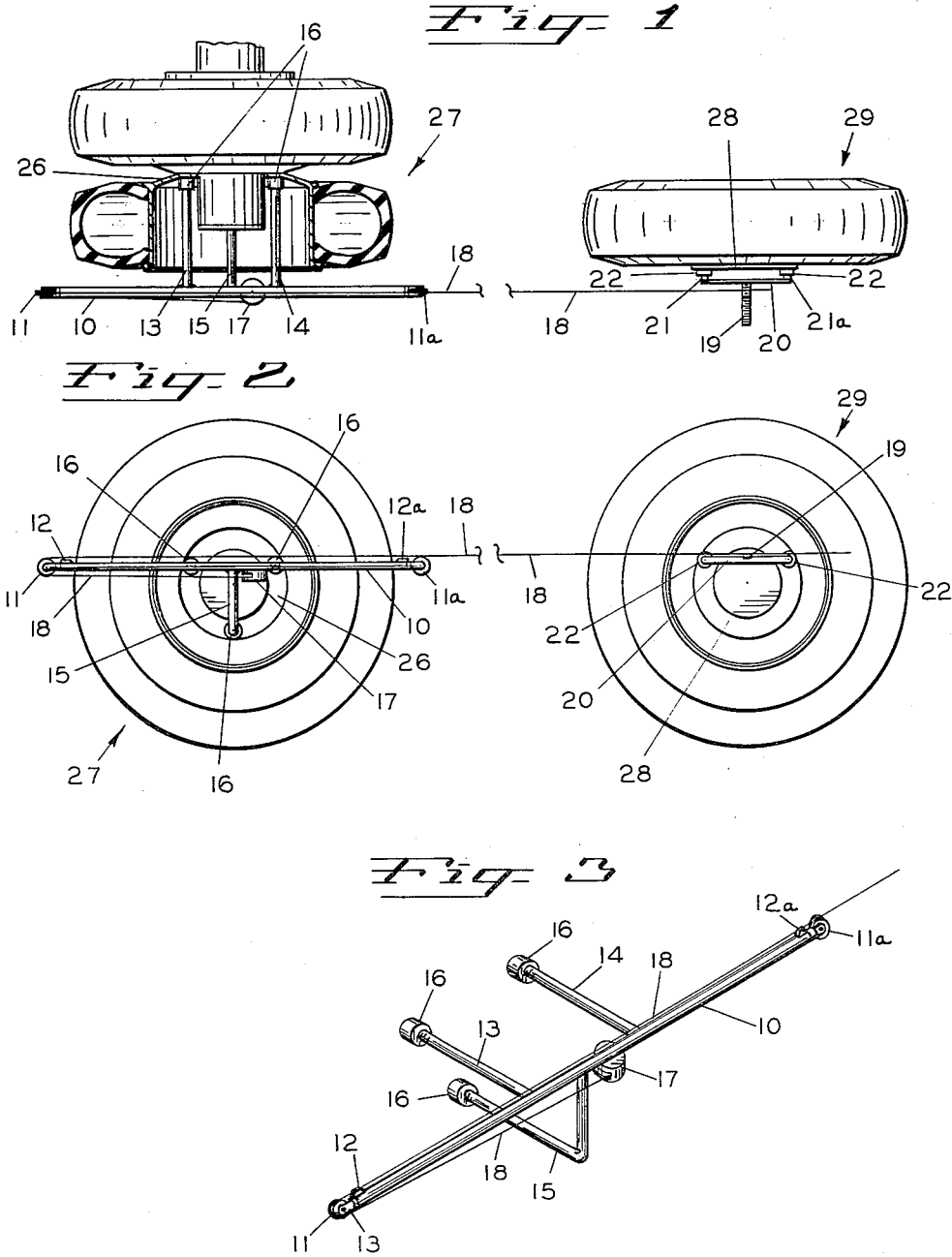
INVENTOR.
ELMER F. BENNETT
BY
Kimmel & Crowell
ATTORNEYS May 7, 1963 E. F. BENNETT 3,088,214
ALIGNING DEVICE
Filed May 29, 1961 2 Sheets-Sheet 2
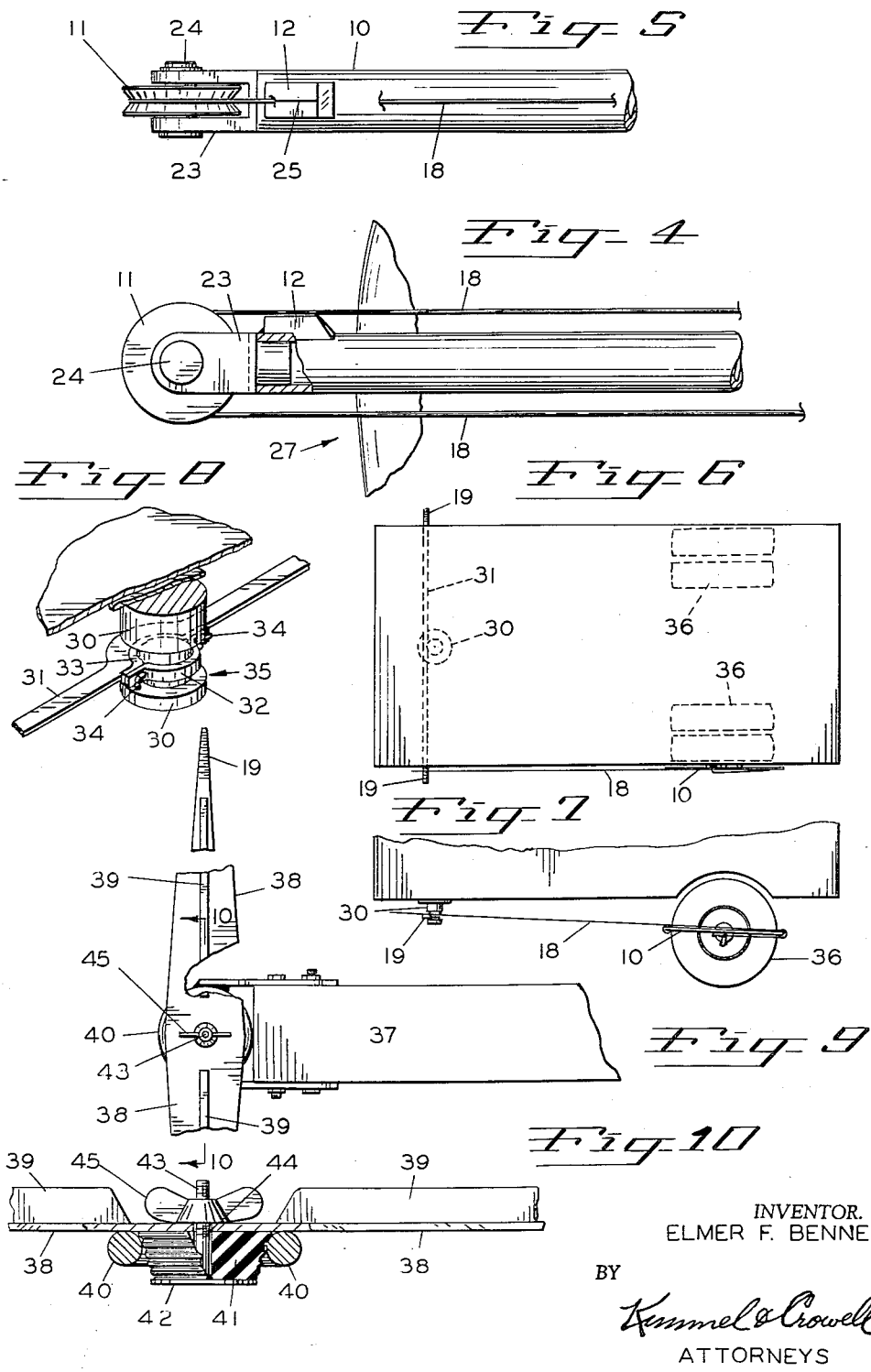
INVENTOR.
ELMER F. BENNETT
BY
Kimmel & Crowell
ATTORNEYS

United States Patent Office 3,088,214
Patented May 7, 1963

3,088,214
ALIGNING DEVICE
Elmer F. Bennett, Portland, Oreg., assignor of one-fifth to Ledford-Todd Corporation, Portland, Oreg.
Filed May 29, 1961, Ser. No. 113,422
1 Claim. (Cl. 33—203.15)

This invention relates to an aligning device and has particular applicability to a device for aligning the rear axles of trucks, trailers, and similar vehicles.

A primary object of the invention is the provision of a simple and highly efficient device for aligning the rear wheels of a truck or trailer or similar vehicle which may be utilized by a single individual, thus saving the usual expense and time of the two men customarily employed for this work.

An additional object of the invention is the provision of a device by means of which a single individual can align the wheels in an extremely rapid and expeditious manner with assurance of accuracy.

A further object of the invention is the provision of such a device which by insuring proper alignment of the rear wheels, will in turn guarantee even tire wear and proper load balance by the insurance of proper tracking of the rear wheels.

A further object of the invention is the provision of a device which may be readily adapted to various types of commercial trailers by the addition of adapters to accommodate or replace the front wheels of a truck.

A further object of the invention is the provision of a device of this character which is sturdy and durable in construction, reliable and efficient in operation, and relatively simple and inexpensive to manufacture and utilize.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIGURE 1 is a top plan view, partially in section and partially in elevation, showing the device of the instant invention diagrammatically as applied to the front and rear wheels of a truck.

FIGURE 2 is a diagrammatic side elevational view of the structure of FIG. 1.

FIGURE 3 is a perspective view of the device in disassembled relation shown as removed from the wheels of a vehicle.

FIGURE 4 is a fragmentary side elevational view partially broken away of the device.

FIGURE 5 is a top plan view of the construction of FIG. 4.

FIGURE 6 is a partially diagrammatic plan view of a truck trailer illustrating the adaptation of mounting the device for aligning the rear wheels.

FIGURE 7 is a fragmentary side elevational view of the construction disclosed in FIG. 6.

FIGURE 8 is a fragmentary perspective view of the trailer connection as disclosed in FIGS. 6 and 7 showing the means of securing the graduated scale bar to the trailer connector.

FIGURE 9 is a plan view of a modified form of trailer connector showing the adaptation of the graduated scale bar thereto; and FIGURE 10 is a sectional view taken substantially along the line 10—10 of FIG. 9 as viewed in the direction indicated by the arrows on an enlarged scale.

Similar reference characters refer to similar parts throughout the several views of the drawing.

Having reference now to the drawings in detail, the device of the instant invention consists of an elongated bar or body 10 on each end of which is mounted a pulley 11 and 11a, as best shown in FIGS. 4 and 5, to be described later. Immediately inward from each pulley 11 and 11a on the topside of the body 10 are guide appendages 12 and 12a, whose purpose will be explained later. Forming a part of the elongated body 10 are horizontally disposed mounting legs 13 and 14, while an offset third mounting leg 15 completes the mounting or support for body 10. On the inner ends of the mounting legs 13, 14, and 15 are affixed mounting magnets 16. Mounted also on elongated body 10 is an automatic spring loaded and operated reel 17 which contains an aligning line 18.

Referring specifically to FIGS. 4 and 5, pulley 11 is shown attached to elongated body 10 by means of a U-shaped pulley-frame member 23, fixedly mounted on body 10, and a pulley axle member 24, within the U-shaped pulley-frame member 23. The aligning guide appendage 12 is of such height so as not to interfere with the free movement of the line 18. In FIG. 5 is shown a fine guide line 25 scribed upon the top of guide appendage 12.

For mounting on the front wheels, the device includes a graduated scale 19, horizontally disposed from the front wheel by a mount or support which consists of a short elongated body 20 with short supporting legs 21 and 21a, to which are attached a pair of mounting magnets 22.

In the operation and use of this device, it is placed against the metal wheel disk 26 of the rear wheel 27 of a truck and is securely held in this position by the action or pull of magnets 16 against the metal wheel disk 26, as shown in FIGS. 1 and 2. Graduated scale 19 is attached to a metal front wheel disk 28 of the right front wheel 19 in a like manner, employing magnets 22 to hold the scale assembly in place. Next, the line 18 is pulled from within the spring loaded reel 17 and the line 18 is then placed around pulley 12, and run to the front wheel graduated scale 19. The line 18 is moved inwardly or outwardly along the scale 19 until the line 18 is aligned directly above scribe mark 25 of guide appendage 12 and above the associated or corresponding scribe mark on guide appendage 12a. When this alignment is made, a reading is taken of scale 19 where line 18 strikes said scale. The line is held taut by the pull-return action or force applied by the spring within the reel 17.

The device is then removed from the right-hand side of the truck and placed on the left-hand wheels in a corresponding way as above-described. To achieve this reversibility, the line 18 is placed around pulley 11a instead of pulley 11. A similar aligning of the line 18 is made and a reading on scale 19 is taken, as above-described. The difference of the two readings taken is split in two and the rear wheels adjusted in the conventional manner in an amount equal to this final calculated figure; i.e., the split difference in the two readings.

FIGURES 6, 7, 8, 9 and 10 represent the employment of this device in the alignment of trailers, whose wheels must track evenly behind a towing truck, etc. FIGS. 6 and 7 illustrate a box-type trailer as representative of the type trailer that uses one type of trailer connector as indicated at 30, as detailed in FIG. 8. With this style trailer connector, an elongated bar 31, with a graduated scale 19 on each end, is substituted for a truck's front wheel scale assembly, as shown in FIGS. 1 and 2 and above-described. Elongated bar 31 is attached to trailer connector 30, as shown in FIG. 8, by use of a half-clamp 32 secured to an integral half-clamp 33 on bar 31. These half-clamps are secured together by wing nuts 34 within the reduced portion 35 of trailer connector 30. The trailer is now rigged for aligning the trailer's rear wheels 36 in a like manner as above-described for the truck itself.

FIGS. 9 and 10 illustrate a type of trailer connector used on logging truck tongues 37, and the like. Shown here is an elongated tapered flattened member 38, having a graduated scale 19 located on its extremities. Elongated member 38 is reinforced for strength by a reinforcing rib member 39, suitably located along its length. To adapt member 38 for suitable mounting on a ring trailer connector 40, a tapered multi-ridged rubber stopper-like member 41 is employed which is readily attached and removed. On the bottom of rubber member 41 is a circular metal plate 42 with a bolt 43 integrated therewith. The circular plate 42 is of a diameter to fit freely within the inside diameter of the trailer connector ring 40, to facilitate ease in placement and removal of the unit. By placing rubber member 41 within ring 40, then placing elongated member 38 on top of ring 40, while at the same time inserting bolt 43 through a bore 44, suitably located at the center of the bar 38, and securing the assembly together by wing nut 45, the assembly can be cinched down until it is securely affixed to the ring connector 40. The alignment of the wheels is then made in the above-described manner, as for the truck.

The guide scale bars 31 and 38 are attached to their respective trailer connectors 30 and 40 so that each is positioned at right angles to the longitudinal center lines of the respective trailers whose wheels are to be aligned for proper tracking, etc. The guide bars permit the use of the instant invention on trailers in the same manner in which the invention is used on trucks.

As many embodiments may be made of this inventive concept, and as many modifications may be made in the embodiments hereinbefore shown and described, it is to be understood that all matter herein is to be interpreted merely as illustrative and not in a limiting sense.

I claim:

An aligning device for vehicle wheels comprising an elongated bar, a pair of spaced legs of equal length disposed longitudinally of said bar, a third leg including a first portion extending perpendicular to said first pair of legs at a point between and equidistant from the legs of said pair and a second portion at right angles to said first portion and extending parallel to each leg of said pair, said second portion being equal in length to the legs of said pair, a mounting magnet at the end of each leg, a guide apendage adjacent each end of said body on the side thereof opposite said first portion of said third leg, a pulley at each end of said bar, a spring loaded reel secured to said bar on the side opposite said guide apendages, an aligning line in said reel extended along said opposite side of said bar over one of said pulleys and then over said guide apendages and the other of said pulleys, a graduated scale attached to the other end of said line for alignment with said bar, a mount for said scale including a pair of relatively short legs, at each end thereof, and magnetic attaching means at each end of each of said last-mentioned legs.

References Cited in the file of this patent

UNITED STATES PATENTS

| | | |
|---|---|---|
| 669,807 | Rathke | Mar. 12, 1901 |
| 2,190,709 | Friestedt | Feb. 20, 1940 |
| 2,292,968 | Peters | Aug. 11, 1942 |
| 2,479,723 | Brown | Aug. 23, 1949 |
| 2,689,403 | Wilkerson | Sept. 21, 1954 |
| 2,788,584 | Adrien | Apr. 16, 1957 |
| 2,845,718 | Keymer | Aug. 5, 1958 |
| 2,877,560 | Brown et al. | Mar. 17, 1959 |

FOREIGN PATENTS

| | | |
|---|---|---|
| 130,331 | Australia | Nov. 29, 1948 |